United States Patent [19]
Toyoda et al.

[11] 4,395,531
[45] Jul. 26, 1983

[54] PROCESS FOR THE PREPARATION OF POLYAMIDE COMPOUNDS BY THE REACTION OF POLYCARBOXYLIC ACIDS WITH DIISOCYANATES IN THE PRESENCE OF AT LEAST ONE MONO-ALKALI METAL SALT OF DICARBOXYLIC ACID

[75] Inventors: Toshihiro Toyoda; Motoo Kawamata; Masanori Osawa; Masayoshi Itoh; Kazumi Mizutani, all of Yokohama; Masahiro Kôno, Kanagawa, all of Japan

[73] Assignee: Mitsui Toatsu Chemical Incorporated, Japan

[21] Appl. No.: 351,602

[22] Filed: Feb. 23, 1982

[30] Foreign Application Priority Data

Mar. 14, 1981 [JP] Japan .................................. 56/37132
Apr. 28, 1981 [JP] Japan .................................. 56/63328

[51] Int. Cl.³ ............................................ C08G 18/34
[52] U.S. Cl. ...................................... 528/49; 528/52; 528/57
[58] Field of Search ............................... 528/49, 57, 52

[56] References Cited

U.S. PATENT DOCUMENTS 4,061,622 12/1977 Onder .............................. 260/78 R
4,094,866 6/1978 Onder .............................. 260/78 R
4,156,065 5/1979 Onder et al. ......................... 528/51

OTHER PUBLICATIONS

Jl. of Applied Polymer Science, vol. IV No. 11 (1960), pp. 207-211 "Catalysis of the Isocyanate-Hydroxyl Reaction" by J. W. Britain et al.
"Polyurethanes-Chemistry and Technology" Part I Chemistry by J. H. Saunders, Interscience, pp. 228-232.

Primary Examiner—Maurice J. Welsh
Attorney, Agent, or Firm—McGlew & Tuttle

[57] ABSTRACT

Disclosed is a process for the preparation of polyamide compounds by reacting at least one polycarboxylic acid with at least one diisocyanate in the presence of a catalyst comprising at least one mono-alkali metal salt of dicarboxylic acid. The polyamide compounds prepared by this process have a substantially linear configuration and a high degree of polymerization and, therefore, are suitable for the manufacture of fibers, films and molded articles.

13 Claims, No Drawings

PROCESS FOR THE PREPARATION OF POLYAMIDE COMPOUNDS BY THE REACTION OF POLYCARBOXYLIC ACIDS WITH DIISOCYANATES IN THE PRESENCE OF AT LEAST ONE MONO-ALKALI METAL SALT OF DICARBOXYLIC ACID

BACKGROUND OF THE INVENTION

1. Field of the Invention

This invention relates to a process for the preparation of polyamide compounds from polycarboxylic acids and diisocyanates.

2. Description of the Prior Art

It is already known that polyamides can be prepared from dicarboxylic acids and diisocyanates. It is also known that polyamide acids can likewise be prepared from tricarboxylic or tetracarboxylic acids and diisocyanates and such polyamide acids can be used as precursors to form imide linkages by ring closure through intramolecular dehydration and thereby product polyamide imides or polyimides. In the preparation of polyamides, polyamide acids, or polyamide acids containing imide linkages in a part of the molecular chain by utilizing the aforesaid reactions, it is a common procedure that a polycarboxylic acid react with a polyisocyanate in an organic polar solvent at a temperature ranging from room temperature to 250° C. for a period of 1 to 20 hours. However, the reaction products thus obtained are usually lower in molecular weight than the polyamides prepared from a diamine and a dibasic acid dihalide or the polyamide acids prepared from a diamine and a tricarboxylic acid anhydride monohalide or a tetracarboxylic acid dianhydride. Moreover, a branched or cross-linked polymer tends to be formed, therefor such problems like an increase in the melt viscosity of the polymer, a decrease in the solubility of the polymer, and the like are often encountered. This makes it difficult to produce a linear, high-molecular-weight polymer suitable for use in melt processing or solution processing. Consequently, the uses of the polymers prepared by the aforesaid process are confined chiefly to varnishes, paints, adhesives and the like, and they can hardly be made into various forms requiring excellent physical properties, such as fibers, molded articles and films.

A number of processes for the preparation of a solution of a scarcely branched or cross-linked polymer by reacting a polycarboxylic acid with a polyisocyanate are also known. One exemplary process, which is disclosed in Japanese Patent Publication Nos. 676/'67 and 677/'67, comprises reacting an organic tetracarboxylic acid dialkyl ester with an organic diisocyanate. However, this process is not satisfactorily effective in producing a high-molecular-weight polymer. Moreover, a process for the preparation of a polyamide imide from an imide ring-containing dicarboxylic acid and a diisocyanate is known. This process has the disadvantage that a high-molecular-weight polymer is difficult to be produced or the resulting polymer is liable to gelation. Thus, the polymers prepared by this process are not suitable for the manufacture of satisfactory molded articles.

The catalysts commonly used for reaction with isocyanates are described in a textbook by J. H. Saunders et al., "Polyurethanes Chemistry and Technology", Vol. 1, pp. 228–232, and an article by J. W. Britain et al., J. Applied Polymer Science, Vol. 4, pp. 207–211 (1960). They include, for example, tertiary amines such as triethylamine, triethylenediamine, etc., alkali metal salts such as lithium acetate, sodium oleate, etc., metal alkoxides such as sodium methylate, etc., heavy metal salts such as cobalt naphthenate, cobalt benzoate, etc., and the like. Accordng to the present inventors' investigation, these catalysts were found to have only a minor effect on the reaction of a dicarboxylic acid with a diisocyanate. Moreover, when they were used for the reaction of a tricarboxylic acid and/or a tetracarboxylic acid with a diisocyanate, it proved difficult not only to produce a high-molecular-weight polyamide acid but also to prevent the resulting polymer from gelling in the course of the reaction. Further, the catalysts available for the preparation of polyamides, polyamide imides, polyimides and the like by the reaction of a carboxylic acid or an acid anhydride with an isocyanate include, for example, metal alkoxides as disclosed in U.S. Pat. Nos. 4,001,186, 4,061,622 and 4,061,623; lactamates as disclosed in U.S. Pat. Nos. 4,021,412, 4,094,864 and 4,094,866; cyclic phosphorus oxides as disclosed in U.S. Pat. No. 4,156,065; and the like. However, these compounds failed to manifest a sufficient degree of catalytic effect to produce a high-molecular-weight polyamide compound without causing the gelation of the polymer.

SUMMARY OF THE INVENTION

It is an object of the present invention to provide a process for preparing linear, high-molecular-weight polyamide compounds without causing any side reactions or any deterioration of the product polymer.

It is another object of the present invention to provide a catalyst promoting the reactions by which polyamide compounds suitable for the manufacture of fibers, films and molded articles are synthesized from polycarboxylic acids and diisocyanates.

The above and other objects of the present invention are accomplished by providing, in a process for the preparation of a polyamide compound having one or more repeating units selected from the group essentially consisting of repeating units of the general formulas

(I)

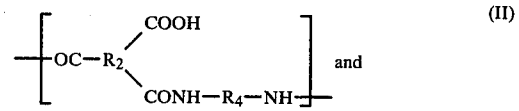

(II)

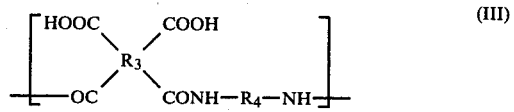

(III)

by reacting at least one polycarboxylic acid selected from the group consisting of dicarboxylic acids of the general formula $$HOOC-R_1-COOH \qquad (IV),$$

tricarboxylic acids of the general formula

(V)

and tetracarboxylic acids of the general formula

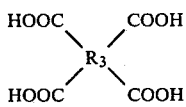

with at least one diisocyanate of the general formula $$OCN-R_4-NCO \qquad (VII)$$

where $R_1$ is a divalent radical containing at least two carbon atoms or such a radical additionally having one or more substituents comprising radicals or atoms that are unreactive or scarcely reactive with carboxyl or isocyanate groups, the two carbonyl groups adjacent to the $R_1$ radical being attached to two different carbon atoms contained in the $R_1$ radical, $R_2$ is a trivalent radical containing at least three carbon atoms or such a radical additionally having one or more substituents comprising radicals or atoms that are unreactive or scarcely reactive with carboxyl or isocyanate groups, two of the three carbonyl groups adjacent to the $R_2$ radical being attached to two adjacent carbon atoms contained in the $R_2$ radical and the remaining one being attached to another carbon atom contained in the $R_2$ radical, $R_3$ is a tetravalent radical containing at least four carbon atoms or such a radical additionally having one or more substituents comprising radicals or atoms that are unreactive or scarcely reactive with carboxyl or isocyanate groups, the four carbonyl groups adjacent to the $R_3$ radical being attached to four different carbon atoms contained in the $R_3$ radical and constituting two different pairs of adjacent carbon atoms, and $R_4$ is a divalent radical containing at least two carbon atoms or such a radical additionally having one or more substituents comprising radicals or atoms that are unreactive or scarcely reactive with carboxyl or isocyanate groups, the two nitrogen atoms adjacent to the $R_4$ radical being attached to two different carbon atoms contained in the $R_4$ radical, the improvement which comprises effecting the reaction in the presence of at least one mono-alkali metal salt of dicarboxylic acid of the general formula $$HOOC-R_5-COOM \qquad (VIII)$$

where $R_5$ is a divalent radical defined similarly to $R_1$ but may be the same as or different from $R_1$, and M is an alkali metal belonging to the group $I_A$ in the periodic table.

DETAILED DESCRIPTION OF THE PREFERRED EMBODIMENTS

The radicals represented by $R_1$, $R_2$, $R_3$, $R_4$ and $R_5$ in the above general formulas are described more specifically. All of these radicals can be, for example, aliphatic, aromatic, heterocyclic, alicyclic or other radicals, such as more than two of the aforesaid radicals are jointed together, for example, by carbon-to-carbon bonds or by such linkages as alkylene, —O—, —S—,

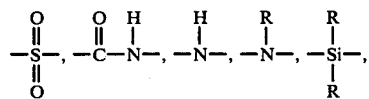

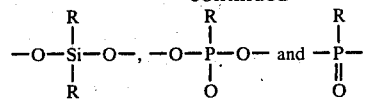

where R is an alkyl, cycloalkyl or aryl radical and more than one R radical may be identical with or different from each other. Typical examples of the aforesaid radicals or atoms that are unreactive or scarcely reactive with carboxyl or isocyanate groups include alkyl radicals, cycloalkyl radicals, aryl radicals, alkoxy radicals, halogen atoms and the like.

Typical examples of the dicarboxylic acids represented by the aforesaid general formula (IV) include oxalic acid, malonic acid, succinic acid, glutaric acid, adipic acid, pimelic acid, suberic acid, azelaic acid, sebacic acid, terephthalic acid, isophthalic acid, hexahydroterephthalic acid, diphenyl ether-4,4'-dicarboxylic acid, diphenyl sulfone-4,4'-dicarboxylic acid, biphenyl-4,4'-dicarboxylic acid, thiophene-2,5-dicarboxylic acid, pyridine-2,6-dicarboxylic acid, naphthalene-2,6-dicarboxylic acid, diphenylmethane-4,4'-bis(trimellitic imide acid), diphenyl ether-4,4'-bis(trimellitic imide acid) and the like. Among these dicarboxylic acids, adipic acid, terephthalic acid, isophthalic acid, diphenyl ether-4,4'-dicarboxylic acid, pyridine-2,6-dicarboxylic acid, diphenylmethane-4,4'-bis(trimellitic imide acid), diphenyl ether-4,4'-bis(trimellitic imide acid) and mixtures thereof are preferred.

Typical examples of the tricarboxylic acids represented by the aforesaid general formula (V) include aliphatic tricarboxylic acids such as butane-1,2,4-tricarboxylic acid, pentane-1,2,5-tricarboxylic acid, etc., alicyclic tricarboxylic acids such as cyclohexane-1,2,3-tricarboxylic acid, etc., aromatic tricarboxylic acids such as benzene-1,2,4-tricarboxylic acid, benzene-1,2,3-tricarboxylic acid, naphthalene-1,2,4-tricarboxylic acid, naphthalene-1,2,5-tricarboxylic acid, naphthalene-1,4,5-tricarboxylic acid, naphthalene-2,3,5-tricarboxylic acid, naphthalene-2,3,6-tricarboxylic acid, diphenyl-3,4,4'-tricarboxylic acid, diphenyl-2,3,2'-tricarboxylic acid, diphenyl sulfone-3,4,3'-tricarboxylic acid, diphenyl ether-3,4,4'-tricarboxylic acid, benzophenone-3,4,4'-tricarboxylic acid, benzophenone-3,3',4-tricarboxylic acid, perylene-3,4,9-tricarboxylic acid, 2-(3,4-dicarboxyphenyl)-2-(3-carboxyphenyl)propane, 2-(2,3-dicarboxyphenyl)-2-(3-carboxyphenyl)propane, 1-(2,3-dicarboxyphenyl)-1-(3-carboxyphenyl)ethane, 1-(3,4-dicarboxyphenyl)-1-(4-carboxyphenyl)ethane, (2,3-dicarboxyphenyl)-(2-carboxyphenyl)methane, etc., heterocyclic tricarboxylic acids such as 2-(3',4'-dicarboxyphenyl)-5-(3'-carboxyphenyl)-1,3,4-oxadiazole, 2-(3',4'-dicarboxydiphenyl ether)-5-(4'-carboxydiphenyl ether)-1,3,4-oxadiazole, 2-(3',4'-dicarboxyphenyl)-5-carboxybenzimidazole, 2-(3',4'-dicarboxyphenyl)-5-carboxybenzoxazole, 2-(3',4'-dicarboxyphenyl)-5-carboxybenzothiazole, pyridine-2,3,5-tricarboxylic acid, etc., and the like. Among these tricarboxylic acids, pentane-1,2,5-tricarboxylic acid, cyclohexane-1,2,3-tricarboxylic acid, benzene-1,2,4-tricarboxylic acid, naphthalele-1,4,5-tricarboxylic acid, naphthalene-2,3,6-tricarboxylic acid, diphenyl-3,4,4'-tricarboxylic acid, diphenyl ether-3,4,4'-tricarboxylic acid, benzophenone-3,3',4-tricarboxylic acid and mixtures thereof are preferred.

Typical examples of the tetracarboxylic acids represented by the aforesaid general formula (VI) include aliphatic tetracarboxylic acids such as butane-1,2,3,4-tetracarboxylic acid, pentane-1,2,4,5-tetracarboxylic acid, etc., alicyclic tetracarboxylic acids such as cyclobutane-1,2,3,4-tetracarboxylic acid, cyclopentane-1,2,3,4-tetracarboxylic acid, cyclohexane-1,2,3,4-tetracarboxylic acid, etc., aromatic tetracarboxylic acids such as benzene-1,2,4,5-tetracarboxylic acid, naphthalene-1,4,5,8-tetracarboxylic acid, naphthalene-2,3,6,7-tetracarboxylic acid, naphthalene-1,2,4,5-tetracarboxilic acid, biphenyl-3,3',4,4'-tetracarboxylic acid, biphenyl-2,3,5,6-tetracarboxylic acid, biphenyl-2,2',3,3'-tetracarboxylic acid, biphenyl-2,2',6,6'-tetracarboxylic acid, benzophenone-3,3',4,4'-tetracarboxylic acid, benzophenone-2,2',3,3'-tetracarboxylic acid, benzophenone-2,3,3',4'-tetracarboxylic acid, diphenyl ether-3,3',4,4'-tetracarboxylic acid, diphenyl sulfone-3,3',4,4'-tetracarboxylic acid, perylene-3,4,9,10-tetracarboxylic acid, phenanthrene-1,8,9,10-tetracarboxylic acid, anthracene-2,3,6,7-tetracarboxylic acid, p-benzoquinone-2,3,5,6-tetracarboxylic acid, azobenzene-3,3',4,4'-tetracarboxylic acid, 2,2-bis(3,4-dicarboxyphenyl)propane, 2,2-bis(2,3-dicarboxyphenyl)propane, 1,1-bis(2,3-dicarboxyphenyl)ethane, 1,1-bis(3,4-dicarboxyphenyl)ethane, bis(2,3-dicarboxyphenyl)methane, bis(3,4-dicarboxyohenyl)methane, 2,2-bis(3,4-dicarboxyphenyl)hexafluoropropane, etc., heterocyclic tetracarboxylic acids such as thiophene-2,3,4,5-tetracarboxylic acid, furan-2,3,4,5-tetracarboxylic acid, pyridine-2,3,5,6-tetracarboxylic acid, etc., and the like. Among these tetracarboxylic acids, butane-1,2,3,4-teracarborylic acid, benzene-1,2,4,5-tetracarboxylic acid, naphthalene-1,4,5,8-tetracarboxylic acid, naphthalene-2,3,6,7-tetracarboxylic acid, biphenyl-3,3',4,4'-tetracarboxylic acid, benzophenone-3,3',4,4'-tetracarboxylic acid, diphenyl ether-3,3,,4,4'-tetracarboxylic acid, diphenyl sulfone-3,3',4,4'-tetracarboxylic acid and mixtures thereof are preferred.

Typical examples of the diisocyanates represented by the aforesaid general formula (VII) include aliphatic diisocyanates such as 1,2-diisocyanatoethane, 1,2-diisocyanatopropane, tetramethylene-1,4-diisocyanate, pentamethylene-1,5-diisocyanate, hexamethylene-1,6-diisocyanate, nonamethylene-1,9-diisocyanate, decamethylene-1,10-diisocyanate, dipropyl ether-ω,ω'-diisocyanate, etc., alicyclic diisocyanates such as cyclohexane-1,4-diisocyanate, dicyclohexylmethane-4,4'-diisocyanate, hexahydrodiphenyl-4,4'-diisocyanate, hexahydrodiphenyl ether-4,4'-diisocyanate, etc., aromatic diisocyanates such as phenylene-1,3-diisocyanate, phenylen-1,4-diisocyanate, toluylene-2,6-diisocyanate, toluylene-2,4-diisocyanate, 1-methoxybenzene-2,4-diisocyanate, 1-chlorophenylene diisocyanate, tetrachlorophenylene diisocyanate, m-xylylene diisocyanate, p-xylylene diisocyanate, diphenylmethane-4,4'-diisocyanate, diphenyl sulfide-4,4'-diisocyanate, diphenyl sulfone-4,4'-diisocyanate, diphenyl ether-4,4'-diisocyanate, diphenyl ether-3,4'-diisocyanate, diphenyl ketone-4,4'-diisocyanate, naphthalene-2,6-diisocyanate, naphthalene-1,4-diisocyanate, naphthalene-1,5-diisocyanate, biphenyl-2,4'-diisocyanate, biphenyl-4,4'-diisocyanate, 3,3'-dimethoxybiphenyl-4,4'-diisocyanate, anthraquinone-2,6-diisocyanate, triphenylmethane-4,4'-diisocyanate, azobenzene-4,4'-diisocyanate, etc., and the like. Among these diisocyanates, hexamethylene-1,6-diisocyanate, dicyclohexylmethane-4,4'-diisocyanate, phenylene-1,3-diisocyanate, phenylene-1,4-diisocyanate, toluylene-2,4-diisocyanate, toluylene-2,6-diisocyanate, diphenylmethane-4,4'-diisocyanate, diphenyl ether-4,4'-diisocyanate and mixtures thereof are preferred.

By using monomers selected from the group consisting of the dicarboxylic acids, tricarboxylic acids, tetracarboxylic acids and diisocyanates represented by the aforesaid general formulas (IV), (V), (VI) and (VII), respectively, in which $R_1$, $R_2$, $R_3$ and $R_4$ comprise various skeletons and linkages as described above, the corresponding repeating units can readily be introduced into the polymer in a regular manner. Thus, the processability, chemical properties, thermal properties, electrical properties and mechanical properties of the polymer can be freely controlled according to the various purpose.

Typical examples of the mono-alkali metal salts of dicarboxylic acids represented by the aforesaid general formula (VIII) include the monolithium, monosodium, monopotassium, monorubidium, monocesium and monofrancium salts of aliphatic dicarboxylic acids such as diglycolic acid, malonic acid, succinic acid, glutaric acid, adipic acid, pimelic acid, suberic acid, azelaic acid, sebacic acid, etc., unsaturated aliphatic dicarboxylic acids such as maleic acid, fumaric acid, citraconinc acid, itaconic acid, etc., alicyclic dicarboxylic acids such as cyclohexane-1,2-dicarboxylic acid, cyclohexane-1,4-dicarboxylic acid, 2,2-dimethyl-3-carboxycyclobutylacetic acid, etc., aromatic dicarboxylic acids such as isophthalic acid, terephthalic acid, biphenyl-4,4'-dicarboxylic acid, diphenyl ether-4,4'-dicarboxylic acid, diphenyl sulfone-4,4'-dicarboxylic acid, diphenylmethane-4,4'-dicarboxylic acid, benzene-1,4-diacetic acid, etc., heterocyclic dicarboxylic acids such as thiophene-2,5-dicarboxylic acid, tetrahydrofuran-2,5-dicarboxylic acid, pyridine-2,6-dicarboxylic acid, etc., and the like. Among these compounds, the monolithium, monosodium and monopotassium salts of adipic acid, sebacic acid, isophthalic acid, terephthalic acid, pyridine-2,6-dicarboxylic acid, tetrahydrofuran-2,5-dicarboxylic acid and cyclohexane-1,4-dicarboxylic acid are preferred. These mono-alkali metal salts of dicarboxylic acids may be used alone or in admixture. Moreover, they may be used in the form of adducts with organic polar solvents such as N-methylpyrrolidone.

When at least one polycarboxylic acid is reacted with at least one diisocyanate in the presence of at least one mono-alkali metal salt of dicarboxylic acid as described above, its catalytic effect does not vary markedly according to the type of the mono-alkali metal salt of dicarboxylic acid used. Although any mono-alkali metal salts of dicarboxylic acids that are advantageous from industrial and economical points of view may be used, a particularly beneficial effect can be obtained by using a mono-alkali metal salt of dicarboxylic acid which resembles in chemical structure either polycarboxylic acid or diisocyanate used.

According to the process of the present invention, the reaction of at least one polycarboxylic acid with at least one diisocyanate in the presence of at least one mono-alkali metal salt of dicarboxylic acid as described above is usually effected in an anhydrous organic polar solvent at a temperature of approximately 20° to 250° C., preferably 50° to 200° C., for a period of approximately 1 to 20 hours, during which the carbon dioxide gas formed as a by-product is removed in a stream of an inert gas (e.g., nitrogen) or under reduced pressure.

Typical examples of the useful organic polar solvents include linear or cyclic amides such as N,N-dimethylacetamide, N,N-diethylacetamide, N,N-dimethylformamide, N-methylpyrrolidone, γ-butyrolactone, hexamethylphosphoric triamide, etc., and sulfones such as tetramethylene sulfone, diphenyl sulfone, etc. These organic polar solvent may be diluted with other aprotic solvents such as benzene, toluene, xylene, cresol, cyclohexane, pentane, hexane, heptane, methylene chloride, tetrahydrofuran, cyclohexanone, dioxane and the like. Moreover, they may contain metal salts such as lithium chloride, calcium chloride and the like.

The way of addition, order of addition, and time of addition of the starting monomers (i.e., the polycarboxylic acid and the diisocyanate) and the mono-alkali metal salt of dicarboxylic acid can be chosen arbitrarily. Although the amid-forming reaction is remarkably accelerated in all cases, the starting monomers and the mono-alkali metal salt of dicarboxylic acid are preferably dissolved in a solvent at room temperature either simultaneously or successively. It is also preferable to dissolve them in a solvent separately and then mix the resulting two or more solutions or, in some cases, to dissolve one or more of them in a solvent and then mix the resulting solution with the remainder in solid form. Moreover, highly expanded high-molecular-weight polymers can also be prepared in a very short period of time by mixing and heating the starting monomers and the mono-alkali metal salt of dicarboxylic acid in the absence of a solvent.

At the beginning of the reaction, the concentration of the starting monomers (i.e., the polycarboxylic acid and the diisocyanate) is usually in the range of 50 to 400 g per liter of the solvent. The selection of a proper concentration depends on the reactivity of the starting monomers, the solubility of the resulting polymer in the solvent, and the like. Where the reaction is initiated with a high concentration of the starting monomers, stirring of the reaction mixture may be interfered due to an increase in viscosity. In some cases, therefore, it is desirable to add the solvent to the reaction mixture either continuously or intermittently.

The polycarboxylic acid and the diisocyanate are preferably used in substantially equimolar amounts. More specifically, the molar ratio of the diisocyanate to the polycarboxylic acid is preferably in the range of 0.7 to 1.30, more preferably 0.90 to 1.15.

The mono-alkali metal salt of dicarboxylic acid is preferably used in an amount of 0.5 to 20 mole %, more preferably 1 to 10 mole %, based on the amount of the polycarboxylic acid.

When the reaction of the present invention (i.e., the reaction of at least one polycarboxylic acid with at least one diisocyanate in the presence of at least one mono-alkali metal salt of dicarboxylic acid) is effected in a substantially anhydrous state and, for example, in an organic polar solvent, a marked increase in reaction rate and an enhancement in polymerization degree are achieved as compared with the reaction in which the same monomers are used but the addition of the mono-alkali metal salt of dicarboxylic acid is omitted. Moreover, the resulting polymer is a linear polymer showing neither branching nor cross-linking.

Since the reaction of the present invention involves decarboxylation and the carbon dioxide formed as a by-product is in gaseous form, removal of the by-product is very easy as compared with the reaction of the amino group with an acid halide or an acid which involves dehydrochlorination or dehydration. Moreover, there is no possibility of the by-product causing side reactions or deterioration of the polymer.

In order to form imide linkages in the molecular chain of a substantially linear, high-molecular-weight polyamide acid prepared by the process of the present invention, commonly used chemical or physical techniques are available. However, the use of such techniques depends on the final form of the desired product. In the case of films and molded articles, for example, void-free products can generally be made by carefully heating them at a temperature of 150° to 350° C. while removing the water produced by the condensation. In the case of fibers spun from a polymer solution, they should be heat-treated carefully. Alternatively, a dehydrating agent such as acetic anhydride and the like may be added to the polymer solution.

The process of the present invention is further illustrated by the following examples which however, are not to be construed to limit the scope of the invention.

In these examples, the inherent viscosity ($\eta_{inh}$) of a polymer was given by the equation $$\eta_{inh} = \frac{\ln(t/t_0)}{C}$$

where $t_0$ is the time required for a fixed volume of a solvent to fall through a viscometer, t is the time required for the same volume of a dilute solution of the polymer in the solvent to fall through the viscometer, and C is the concentration of the polymer as expressed in grams per 100 ml of the solvent. In these examples, the measurement of inherent viscosity was made at 30° C. using a solution having a polymer concentration of 0.1 g per 100 ml of the solvent. Unless otherwise indicated, N-methylpyrrolidone was used as the solvent. Where the use of sulfuric acid is mentioned, 95% sulfuric acid was used as the solvent.

The solution viscosity of a polymer was measured at 25° C. with a Brookfield type viscometer (Tokyo Keiki Seisakusho).

The glass transition temperature (hereinafter referred to as Tg) of a polymer was measured with a thermophysical tester (Perkin-Elmer Co., TMS-1) according to the penetration method.

The decomposition temperature of a polymer was measured with a differential thermal analyzer (Shimazu Seisakusho, DTG-20B) and expressed as the temperature at which a 5% weight loss occurred.

The folding endurance of a film was measured with an M.I.T. type tester according to the procedure described in ASTM-D2176-69 and expressed as the number of cycles at which the film was torn. However, the load applied to the film was 1.0 kg and the distance between the folding surfaces was 1.0 mm.

The abbreviations used in the following examples for representing various monomers (such as tricarboxylic acids, tetracarboxylic acids, diisocyanates, etc.), monoalkali metal salts of dicarboxylic acids, and solvents are given below.

| | |
|---|---|
| NMP: | N—methylpyrrolidone. |
| IPA: | isophthalic acid. |
| DPEDC: | diphenyl ether-4,4'-dicarboxylic acid. |
| PDC: | pyridine-2,6-dicarboxylic acid. |
| TMC: | benzene-1,2,4-tricarboxylic acid. |
| BTC: | butane-1,2,3,4-tetracarboxylic acid. |
| PMC: | benzene-1,2,4,5-tetracarboxylic acid. |
| BPTC: | benzophenone-3,3',4,4'-tetracarboxylic acid. |
| TDI-100: | toluylene-2,4-diisocyanate. |
| TDI-80/20: | a mixture of toluylene-2,4-diisocyanate and toluylene-2,6-diisocyanate in a molar ratio |

|  |  |
|---|---|
|  | of 80:20. |
| TDI-65/35: | a mixture of the same diisocyanates in a molar ratio of 65:35. |
| MDI: | diphenylmethane-4,4'-diisocyanate. |
| HMDI: | hexamethylene-1,6-diisocyanate. |
| PDI: | phenylene-1,3-diisocyanate. |
| DPDI: | diphenyl ether-4,4'-diisocyanate. |
| IPA-Na: | isophthalic acid monosodium salt. |
| IPA-K: | isophthalic acid monopotassium salt. |
| IPA-Li: | isophthalic acid monolithium salt. |
| TPA-Na: | terephthalic acid monosodium salt. |
| TPA-K: | terephthalic acid monopotassium salt. |

EXAMPLE 1

Into a 500-ml flask equipped with a stirrer, a reflux condenser, a thermometer and a nitrogen inlet were charged 15.13 g (0.1035 mole) of adipic acid, 18.39 g (0.1056 mole) of TDI-100, 0.3480 g (0.0021 mole) of adipic acid monosodium salt, and 223 ml of anhydrous NMP. While being stirred under an atmosphere of nitrogen, this reaction mixture was heated on an oil bath and allowed to react at 120° C. for 2 hours. In early stages of the reaction, carbon dioxide gas was evolved vigorously. Since the evolution of the gas was no longer recognized after 2 hours, the heating was discontinued and the reaction mixture was cooled to room temperature. At this time, the reaction mixture was in the form of a slightly yellowish-brown fluid having considerably high viscosity. The resulting polymer solution was poured into 1,100 ml of vigorously stirred methanol. The polymer so precipitated was washed thoroughly with methanol and then dried under a reduced pressure of 2–3 mmHg at 130° C. for 3 hours to give a yield of 23.5 g of slightly yellowish-brown powder. The polymer thus obtained had an inherent viscosity of 1.13.

COMPARATIVE EXAMPLE 1

Reaction was carried out in substantially the same manner as in Example 1, except that the addition of adipic acid monosodium salt was omitted. Specifically, a reaction mixture composed of 15.09 g (0.0964 mole) of adipic acid, 17.12 g (0.0983 mole) of TDI-100, and 215 ml of NMP was allowed to react at 120° C. for 2 hours. However, no remarkable increase in viscosity was observed. The resulting polymer solution was worked up in the same manner as in Example 1 to give a yield of 22.7 g of pale-yellow powder. The polymer thus obtained had an inherent viscosity of 0.38.

EXAMPLE 2

Employing the same procedure as in Example 1, a reaction mixture composed of 15.02 g (0.0904 mole) of IPA, 15.51 g (0.0922 mole) of HMDI, 0.3390 g (0.0018 mole) of IPA-NA, and 204 ml of NMP was allowed to react at 120° C. for 2 hours. In the course of the heating, the evolution of carbon dioxide gas became marked in the vicinity of 80° C. The gas was being actively evolved when the temperature reached 120° C. After an hour, the evolution of the gas was barely recognizable and the reaction mixture showed a considerable increase in viscosity. The heating was discontinued after 2 hours and the reaction mixture was cooled to room temperature. The resulting polymer solution was poured into 1,000 ml of vigorously stirred methanol. The polymer so precipitated was washed thoroughly with methanol and then dried under a reduced pressure of 2–3 mmHg at 130° C. for 3 hours to give a yield of 21.8 g of slightly yellowish-brown powder. The polymer thus obtained had an inherent viscosity of 1.47.

COMPARATIVE EXAMPLE 2

Reaction was carried out in substantially the same manner as in Example 2, except that the addition of IPA-Na was omitted. Specifically, a reaction mixture composed of 15.13 g (0.0911 mole) of IPA, 15.63 g (0.0929 mole) of HMDI, and 205 ml NMP was allowed to react at 120° C. for 2 hours. However, no remarkable increase in viscosity was observed. The resulting polymer solution was worked up in the same manner as in Example 2 to give a yield of 20.9 g of light-brown powder. The polymer thus obtained had an inherent viscosity of 0.43.

EXAMPLE 3

Employing the same apparatus as in Example 1, a reaction mixture composed of 19.69 g (0.1185 mole) of IPA, 21.45 g (0.1232 mole) of TDI-100, 0.8465 g (0.0045 mole) of IPA-Na, and 200 ml of NMP was allowed to react at 140° C. for 4 hours. It took approximately 15 minutes until the reaction mixture reached 140° C. from room temperature. The evolution of carbon dioxide gas became marked at near 80° C. At 140° C., the gas was actively evolved as a result of vigorous reaction. As time passed, the reaction mixture was increasingly colored and its viscosity became higher and higher. After an hour, the carbon dioxide gas evolved was very slowly removed from the reaction system owing to an increase in viscosity. Although the evolution of carbon dioxide gas was hardly recognizable after 2 hours, the reaction was continued for an additional 2 hours. Thereafter, the heating was discontinued and the reaction mixture was cooled to room temperature. In the course of the cooling, stirring of the reaction mixture became very difficult at 125° C., so that 100 ml of NMP was added thereto. The resulting polymer solution was poured into vigorously stirred methanol whose volume (1,500 ml in this example) was equal to five times that of the NMP. The polymer so precipitated was separated by filtration, washed twice with 500-ml portions of methanol, and then dried under a reduced pressure of 2–3 mmHg at 150° C. for 3 hours to give a yield of 29.3 g of yellowish-brown powder tinged with green. The polymer thus obtained had an inherent viscosity of 1.59.

EXAMPLE 4–19 AND COMPARATIVE EXAMPLE 3–15

Employing the same procedure as in Example 3, a series of runs was made in which the type and amount of the starting monomers and the type, amount and method of addition of the mono-alkali metal salt of dicarboxylic acid were varied in various ways. For the purposes of comparison, several runs in which the various combinations of monomers were reacted in the absence of any mono-alkali metal salt of dicarboxylic acid or in the presence of conventional catalysts were also made. The results thus obtained are summarized in Table 1. It is evident from this table that the presence of a mono-alkali metal salt of dicarboxylic acid in the reaction system is very markedly effective in enhancing the molecular weight of the resulting polymer.

TABLE 1

| Example No. | Acid Type | Acid Amount g | Acid moles | Acid Type | Acid Amount g | Acid moles | Isocyanate Type | Isocyanate Amount g | Isocyanate moles | Additive Type | Additive Amount g | Additive moles | Time of addition | Polymerization temperature (°C.) | Polymerization time (hr) | Inherent viscosity ($\eta_{inh}$) of polymer |
|---|---|---|---|---|---|---|---|---|---|---|---|---|---|---|---|---|
| Example 4 | TPA | 19.70 | 0.1186 | | | | TDI-100 | 21.47 | 0.1233 | IPA-Na | 0.8817 | 0.0047 | Charged simultaneously with monomers & solvent | 140 | 4 | 1.64 |
| Example 5 | " | 19.65 | 0.1183 | | | | " | 21.43 | 0.1230 | TPA-K | 0.9395 | 0.0046 | Charged simultaneously with monomers & solvent | " | " | 1.70 |
| Example 6 | " | 20.13 | 0.1212 | | | | " | 20.69 | 0.1188 | " | 1.011 | 0.0050 | Charged simultaneously with monomers & solvent | " | " | 1.23 |
| Comparative Example 3 | " | 19.47 | 0.1172 | | | | " | 21.23 | 0.1219 | | | | | " | " | 0.71 |
| Comparative Example 4 | " | 19.89 | 0.1197 | | | | " | 20.43 | 0.1173 | | | | | " | " | 0.38 |
| Example 7 | TPA | 9.891 | 0.0595 | IPA | 9.785 | 0.0589 | TDI-80/20 | 22.27 | 0.1279 | IPA-Na | 0.8903 | 0.0047 | Charged simultaneously with monomers & solvent | 140 | 4 | 1.74 |
| Example 8 | " | 9.903 | 0.0596 | " | 10.01 | 0.0603 | " | 22.55 | 0.1295 | " | 0.9057 | 0.0048 | Charged as an NMP solution of TPA, IPA & additive | " | " | 1.80 |
| Example 9 | " | 9.954 | 0.0599 | " | 9.910 | 0.0596 | " | 22.48 | 0.1291 | IPA-K | 0.9531 | 0.0047 | Charged simultaneously with monomers & solvent | " | " | 1.79 |
| Example 10 | " | 10.04 | 0.0604 | " | 9.812 | 0.0591 | " | 20.81 | 0.1195 | IPA-Li | 0.7902 | 0.0046 | Charged simultaneously with monomers & solvent | " | " | 1.70 |
| Example 11 | " | 9.871 | 0.0594 | " | 10.33 | 0.0622 | " | 21.18 | 0.1216 | TPA-Na | 1.357 | 0.0072 | Charged simultaneously with monomers & solvent | " | " | 1.80 |
| Example 12 | " | 10.13 | 0.0610 | " | 9.906 | 0.0596 | " | 21.00 | 0.1206 | " | 1.389 | 0.0074 | Charged as an NMP solution of TPA, IPA & additive | " | " | 1.78 |
| Comparative Example 5 | " | 9.849 | 0.0593 | " | 9.918 | 0.0597 | " | 22.38 | 0.1285 | | | | | " | " | 0.66 |
| Example 13 | " | 7.703 | 0.0464 | " | 7.769 | 0.0468 | MDI | 25.13 | 0.1004 | IPA-Na | 0.6938 | 0.0037 | Charged simultaneously with monomers & solvent | " | " | 2.03 |
| Example 14 | TPA | 7.698 | 0.0463 | IPA | 7.813 | 0.0470 | MDI | 25.20 | 0.1007 | IPA-Na | 0.7087 | 0.0038 | Charged after monomers & solvent were heated to 80° C. | 140 | 4 | 2.10 |
| Comparative Example 6 | " | 7.681 | 0.0462 | " | 7.942 | 0.0478 | " | 25.21 | 0.1007 | | | | | " | " | 0.70 |
| Example 15 | TPA | 7.146 | 0.0430 | IPA | 7.109 | 0.0428 | PDI | 15.50 | 0.0974 | IPA-Na | 1.283 | 0.0068 | Charged simultaneously with monomers & solvent | 140 | 4 | 1.82 |
| Example 16 | " | 7.299 | 0.0439 | " | 7.334 | 0.0441 | " | 14.81 | 0.0931 | " | 0.6609 | 0.0035 | Charged simultaneously with monomers & solvent | " | " | 1.71 |
| Comparative Example 7 | " | 7.129 | 0.0429 | " | 7.112 | 0.0428 | " | 15.23 | 0.0957 | | | | | " | " | 0.56 |
| Comparative Example 8 | " | 7.316 | 0.0440 | " | 7.304 | 0.0440 | " | 14.79 | 0.0930 | | | | | " | " | 0.47 |
| Comparative Example 9 | " | 7.491 | 0.0451 | " | 7.510 | 0.0452 | " | 14.65 | 0.0921 | | | | | " | " | 0.35 |
| Example 17 | TPA | 8.665 | 0.0522 | IPA | 8.729 | 0.0525 | HMDI | 20.61 | 0.1131 | IPA-Na | 0.7839 | 0.0042 | Charged simultaneously with monomers & solvent | 140 | 4 | 1.65 |
| Comparative Example 10 | " | 8.703 | 0.0524 | " | 8.697 | 0.0523 | " | 20.49 | 0.1124 | | | | | " | " | 0.63 |

TABLE 1-continued

| Example No. | Acid Type | Acid Amount g | Acid moles | Isocyanate Type | Isocyanate Amount g | Isocyanate moles | Additive Type | Additive Amount g | Additive moles | Time of addition | Polymerization temperature (°C.) | Polymerization time (hr) | Inherent viscosity ($\eta_{inh}$) of polymer |
|---|---|---|---|---|---|---|---|---|---|---|---|---|---|
| Example 18 | DPEDC | 28.37 | 0.1094 | TDI-65/35 | 20.58 | 0.1182 | IPA-Na | 0.8232 | 0.0044 | Charged simultaneously with monomers & solvent | " | " | 1.58 |
| Example 19 | PDC | 23.51 | 0.1398 | " | 26.30 | 0.1510 | " | 1.052 | 0.0056 | Charged simultaneously with monomers & solvent | " | " | 1.67 |
| Comparative Example 11 | DPEDC | 28.61 | 0.1104 | TDI-65/35 | 20.76 | 0.1192 | | | | | 140 | 4 | 0.60 |
| Comparative Example 12 | PDC | 23.89 | 0.1421 | " | 26.73 | 0.1535 | | | | | " | " | 0.67 |
| Comparative Example 13 | " | 23.48 | 0.1396 | " | 26.26 | 0.1508 | Tri-ethyl-amine | 0.5646 | 0.0056 | Charged simultaneously with monomers & solvent | " | " | 0.79 |
| Comparative Example 14 | " | 23.55 | 0.1400 | " | 26.33 | 0.1512 | Sodium oleate | 1.705 | 0.0056 | Charged simultaneously with monomers & solvent | " | " | 0.70 |
| Comparative Example 15 | " | 24.02 | 0.1428 | " | 26.85 | 0.1542 | Sodium methylate | 0.3086 | 0.0057 | Charged simultaneously with monomers & solvent | " | " | 0.61 |

EXAMPLE 20

Into a 300-ml separable flask equipped with a stirrer, a thermometer, a reflux condenser and a nitrogen inlet tube were charged 14.94 g (0.0711 mole) of TMC, 13.13 g (0.0754 mole) of TDI-65/35, 0.3760 (0.0020 mole) of IPA-Na, and 140 ml of NMP. While being stirred under a nitrogen atmosphere, this reaction mixture was rapidly heated on an oil bath until its temperature reached 140° C. When a temperature of 100° C. was reached, the evolution of carbon dioxide gas became active and the reaction mixture began to become brown in color. After being allowed to react at 140° C. for approximately 3 hours, the reaction mixture showed a marked increase in viscosity and assumed a deep reddish-brown color. Although the evolution of carbon dioxide gas was hardly recognizable, the reaction was continued for an additional 3 hours. Thereafter, the reaction mixture was cooled to room temperature. A portion (10 ml) of the resulting polymer solution was poured into 300 ml of methanol. The polymer so precipitated was separated by filtration, washed thoroughly with methanol, and then dried under a reduced pressure of 2-3 mmHg at 50° C. for 3 hours to give a yield of 1.47 g of yellowish-brown powder.

The polymer thus obtained had an inherent viscosity of 1.48. The polymer solution obtained after completion of the reaction had a polymer content of 12.4% by weight and a viscosity of 49 poises. When this polymer solution was sealed in a container and stored indoors for 3 months, no changes in properties were observed.

COMPARATIVE EXAMPLE 16

Reaction was carried out in essentially the same manner as in Example 20, except that the addition of IPA-Na was omitted. Specifically, a reaction mixture composed of 14.90 g (0.0709 mole) of TMC, 13.10 g (0.0752 mole) of TDI-65/35, and 140 ml of NMP was allowed to react at 140° C. for 6 hours. Two hours after the beginning of the reaction, the reaction mixture showed a deep reddish-brown color and the evolution of carbon dioxide gas was active. However, the viscosity of the reaction mixture showed only a slight increase and did not change markedly thereafter.

The resulting polymer solution was worked up in the same manner as in Example 20. The polymer thus obtained had an inherent viscosity of 0.43. The viscosity of a solution containing 12.5% by weight of this polymer was 2.1 poises.

EXAMPLE 21

Employing the same apparatus as in Example 20, a reaction mixture composed of 18.54 g (0.0882 mole) of TMC, 23.40 g (0.0935 mole) of MDI, 0.4978 g (0.0026 mole) of IPA-Na, and 210 ml of NMP was allowed to react at 140° C. for 6 hours. One hour after the beginning of the reaction, the reaction mixture showed a considerable increase in viscosity and also showed a reddish-brown color, and the evolution of carbon dioxide gas was observed clearly. After 3 hours, the evolution of carbon dioxide gas was hardly recognizable.

A portion of the resulting polymer solution was worked up in the same manner as in Example 20 to give a yield of 1.46 g of yellowish-green powder. The polymer thus obtained had an inherent viscosity of 1.43. The viscosity of a solution containing 12.9% by weight of this polymer was 50 poises.

COMPARATIVE EXAMPLE 17

Reaction was carried out in substantially the same manner as in Example 21, except that the addition of IPA-Na was omitted. Specifically, a reaction mixture composed of 18.45 g (0.0877 mole) of TMC, 23.23 g (0.0930 mole) of MDI, and 208 ml of NMP was allowed to react at 140° C. for 6 hours. As the reaction proceeded, the reaction mixture was gradually colored in brown. Two hours after the commencement of the reaction, it assumed a reddish-brown color, but no appreciable increase in viscosity was observed. Moreover, the evolution of carbon dioxide gas was hardly recognizable after 2 hours.

The resulting polymer solution was worked up in the same manner as in Example 20. The polymer thus obtained had an inherent viscosity of 0.40. The viscosity of a solution containing 12.9% by weight of this polymer was 1.9 poises.

EXAMPLE 22

The remaining portion of the polymer solution obtained in Example 20 was subsequently heated to 190° C. on an oil bath and allowed to react at that temperature for 2 hours. In the course of the heating over an approximately one-hour period, the viscosity of the polymer solution initially showed a considerable decrease, but increased again as the temperature approached 190° C. After 2 hours of reaction, the polymer solution was cooled to room temperature. In the course of the cooling, a total of 50 ml of NMP was added as required thereto for the purpose of facilitating the dissolution of the polymer. A 20-ml portion of the resulting polymer solution was poured into 500 ml of methanol. The polymer so precipitated was separated by filtration, washed three times with 200-ml portions of methanol, and then dried under a reduced pressure of 2-3 mmHg at 150° C. for 3 hours to give a yield of 2.12 g of yellowish-brown powder tinged with green.

The polymer thus obtained had an inherent viscosity of 1.52 as measured in sulfuric acid. The sheet of 0.32 mm thickness formed by hot-pressing this polymer at 350° C. and 200 kg/cm$^2$ had a glass transition temperature (Tg) of 316.4° C. Moreover, this polymer had a decomposition temperature of 428° C.

COMPARATIVE EXAMPLE 18

Employing the same procedure as in Example 22, the remaining portion of the polymer solution obtained in Comparative Example 16 was allowed to react at 190° C. for 2 hours. In the course of the reaction, the polymer solution turned dark brown, but no increase in viscosity was observed. Thus, it was unnecessary to add NMP to the polymer solution in the course of cooling thereof.

The resulting polymer solution was worked up in the same manner as in Example 22 to yield a yellowish-brown powder. The polymer thus obtained had an inherent viscosity of 0.45 as measured in sulfuric acid. The sheet of 0.35 mm thickness formed by hot-pressing this polymer at 350° C. and 200 kg/cm$^2$ had a glass transition temperature (Tg) of 315.2° C. Moreover, this polymer had a decomposition temperature of 424° C.

EXAMPLE 23 AND COMPARATIVE EXAMPLE 19

The polymer solution obtained in Example 21 and Comparative Example 17 were worked up in the same manner as in Example 22 and Comparative Example 18, respectively. The results of evaluation of the polymers thus obtained are tabulated below. It is evident that these polymers are polyamide imides having imide linkages formed in the molecule and a polyamide imide having a much higher molecular weight can readily be prepared by adding a monoalkali metal salt of dicarboxylic acid to the reaction system.

| | Inherent viscosity (in sulfuric acid) | Glass transition temperature of pressed sheet | IR spectrum of polymer (identification of absorption bands of imide linkages) |
|---|---|---|---|
| Example 23 | 1.56 | 271.6° C. | 1780,1720,1375,720 cm$^{-1}$ |
| Comparative Example 19 | 0.45 | 270.8° C. | 1780,1720,1375,720 cm$^{-1}$ |

EXAMPLES 24–26 AND COMPARATIVE EXAMPLES 20–24

Employing the same apparatus and procedure as in Example 20, several polyamide acids were prepared from the combinations of monomers and additive shown in Table 2. The results of evaluation of the polymers thus obtained are summarized in Table 2.

It is evident from this table that polyamide acids having a high degree of polymerization can readily be prepared by adding a mono-alkali metal salt of dicarboxylic acid to the reaction system.

from room temperature to 120° C. as rapidly as possible. In the course of the heating, the evolution of carbon dioxide gas became very active at approximately 80° C. and the reaction mixture showed a considerable increase in viscosity at 100° C. It took approximately 10 minutes for the temperature of the reaction mixture to reach 120° C. As time passed, the reaction mixture became increasingly brown in color. After 2 hours, the reaction mixture was in the form of a deep-brown fluid having very high viscosity and the evolution of carbon dioxide gas was hardly observed. After the reaction was continued for an additional 2 hours, the reaction mixture was cooled to room temperature. In the course of the cooling, the viscosity of the reaction mixture increased to such an extent as to interfere with stirring thereof, so that the reaction mixture was intermittently diluted with a total of 50 ml of NMP. A portion of the resulting polymer solution was worked up in the same manner as in Example 20 to yield a yellowish-brown powder.

The polymer thus obtained had an inherent viscosity of 1.68. The polymer solution obtained as above had a polymer content of 12.3% by weight and a viscosity of 58 poises. When this polymer solution was sealed in a container and stored indoors for 3 months, no changes in properties were observed. This polymer was easily soluble in cresol. On the other hand, a portion of the polymer solution was applied to a glass plate having a parting agent baked thereon and dried in a stream of nitrogen at 100° C. for 3 hours. The self-supporting film

TABLE 2

| | Synthesis of Polyamide Acids Polymerization temperature: 140° C. Polymerization time: 6 hours | | | | | | | | |
|---|---|---|---|---|---|---|---|---|---|
| | Monomers | | | | Monomer | | Polymer solution | | |
| | Acid | Isocyanates | | Additive | concentration | Molar | | Solution | Inherent |
| Example No. | TMC (g) [moles] | TDI-65/35 (g) [moles] | MDI (g) [moles] | Type (g) [moles] | (g/l of NMP) [volume of NMP (ml)] | ratio of isocyanate to acid | Polymer content (wt. %) | viscosity at 25° C. (poises) | viscosity ($\eta_{inh}$) of polymer |
| Example 24 | 15.13 [0.0720] | 9.300 [0.0534] | 5.406 [0.0216] | IPA-Na 0.4063 [0.0022] | 200 [150] | 1.06 | 12.9 | 45 | 1.43 |
| Example 25 | 15.09 [0.0718] | 9.277 [0.0533] | 5.708 [0.0228] | IPA-K 0.4510 [0.0022] | 200 [150] | 1.06 | 12.7 | 51 | 1.47 |
| Example 26 | 15.37 [0.0731] | 9.456 [0.0543] | 5.809 [0.0232] | IPA-Li 0.3769 [0.0022] | 200 [153] | 1.06 | 12.8 | 50 | 1.46 |
| Comparative Example 20 | 15.32 [0.0726] | 9.387 [0.0539] | 5.781 [0.0231] | — | 200 [152] | 1.06 | 12.8 | 1.7 | 0.41 |
| Comparative Example 21 | 15.01 [0.0714] | 8.969 [0.0515] | 5.518 [0.0220] | — | 200 [147] | 1.03 | 13.0 | 1.8 | 0.40 |
| Comparative Example 22 | 15.41 [0.0733] | 9.474 [0.0544] | 5.831 [0.0233] | Triethylamine 0.2120 [0.0031] | 200 [154] | 1.06 | 12.7 | 2.0 | 0.45 |
| Comparative Example 23 | 15.16 [0.0721] | 9.317 [0.0535] | 5.756 [0.0230] | Sodium oleate 0.6585 [0.0022] | 200 [151] | 1.06 | 12.8 | 2.7 | 0.47 |
| Comparative Example 24 | 15.63 [0.0744] | 9.613 [0.0552] | 5.920 [0.0237] | Sodium methylate 0.1204 [0.0022] | 200 [156] | 1.06 | 12.7 | 2.2 | 0.43 |

EXAMPLE 27

Employing the same apparatus as in Example 20, a reaction mixture composed of 15.52 g (0.0663 mole) of BTC, 12.47 g (0.0716 mole) of TDI-65/35, 0.6882 g (0.0040 mole) of adipic acid monosodium salts, and 93 ml of NMP was heated on an oil bath and allowed to react at 120° C. for 4 hours. The temperature was raised so formed was peeled off, suspended in a vacuum dryer, and dried under a reduced pressure of 2–3 mmHg at 250° C. for 3 hours to give a very tough, brown film. This film neither dissolved nor swelled in cresol. Infrared spectroscopic analysis revealed the presence of the amide linkage.

COMPARATIVE EXAMPLE 25

Reaction was carried out in substantially the same manner as in Example 27, except that the addition of adipic acid monosodium salt was omitted. Specifically, a reaction mixture composed of 15.10 g (0.0645 mole) of BTC, 12.13 g (0.0696 mole) of TDI-65/35, and 91 ml of NMP was allowed to react at 120° C. for 3 hours. After 2 hours of reaction at 120° C., the evolution of carbon dioxide gas was markedly observed and the reaction mixture showed a deep brown color. Since the viscosity of the reaction mixture gradually increased to such an extent as to interfere with stirring thereof, 50 ml of NMP was added, but no reduction in viscosity occurred. Thereafter, the whole reaction mixture changed rapidly into a gelatinous state in approximately 15 minutes. An attempt was made to deflocculate it with an additional 50 ml of NMP, but failed to form a homogeneous solution. Due to such conditions, the reaction was stopped after a total of 3 hours and the reaction mixture was cooled to room temperature. A portion of the gelatinous product was put into a large volume of vigorously stirred methanol to yield a fine but hard powder. This powder was washed thoroughly with methanol and then dried under a reduced pressure of 2-3 mmHg at 50° C. for 3 hours to yield a yellowishbrown powder tinged with green.

The polymer thus obtained contained a large amount of sulfuric acid-insoluble matter, so that its inherent viscosity could not be measured accurately.

EXAMPLES 28-32 AND COMPARATIVE EXAMPLES 25-29

Employing the same apparatus as in Example 20 and the same procedure as in Example 27, several polyamide acids were prepared among the combinations of monomers and additive shown in Table 3. The results of evaluation of the polymers thus obtained are summarized in Table 3.

The properties of cast films shown in this table indicate that the polyamide acids prepared in accordance with the present invention can readily be converted, by imidation through ring closure of the polyamide acid, to polyimides or polyamide imides having a high glass transition temperature and a high decomposition temperature as well as excellent physical properties. This also means that the process of the present invention makes it possible to readily prepare linear, high-molecular-weight polymeric precursors of polyamides or polyamide imides by using polycarboxylic acids and diisocyanates as starting materials.

In the formation of cast films, a polymer solution was prepared by dissolving a polymer in NMP so as to give a polymer content of approximately 15% by weight. Using this polymer solution, a film having a thickness of 60–70μ was formed in the same manner as in Example 27. The film suspended in a vacuum dryer was dried under a reduced pressure of 2-3 mmHg at 350° C. for 4 hours. The polymers obtained in Comparative Examples 25-28 failed to form a film.

TABLE 3

Synthesis of Polyamide Acids and Properties Thereof
Polymerization temperature: 120° C.
Polymerization time: 4 hours

| Example No. | Monomers Acid(s) Monomer I (g) [moles] | Monomer II (g) [moles] | Isocyanate Monomer III (g) [moles] | Additive Type (g) [moles] | Monomer concentration (g/l of NMP) [volume of NMP (ml)] | Molar ratio of isocyanate to acid | Polymer content (wt. %) | Solution viscosity at 25° C. (poises) | Inherent viscosity ($\eta_{inh}$) of polymer | Tensile strength (kg/cm$^2$); Elongation (%) | Glass transition temperature (°C.) | Decomposition temperature (°C.) | M.I.T. folding endurance (cycles) |
|---|---|---|---|---|---|---|---|---|---|---|---|---|---|
| Example 28 | PMC 20.15 [0.0694] | | DPDI 15.17 [0.0722] | IPA-K 0.2611 [0.0014] | 200 [177] | 1.04 | 13.2 | 105 | 1.79 | 1,680 58 | 358 | 555 | >3 × 10$^4$ |
| Comparative Example 26 | PMC 20.63 [0.0711] | | DPDI 15.54 [0.0739] | — | 200 [181] | 1.04 | — | — | Marked degree of gelation | — | — | — | — |
| Example 29 | PMC 10.35 [0.0357] | BPTC 11.51 [0.0357] | DPDI 16.21 [0.0771] | TPA-Na 0.5270 [0.0028] | 250 [152] | 1.08 | 15.8 | 310 | 1.84 | 1,540 34 | 338 | 536 | >3 × 10$^4$ |
| Comparative Example 27 | PMC 10.29 [0.0355] | BPTC 11.49 [0.0357] | DPDI 16.17 [0.0769] | — | 250 [152] | 1.08 | — | — | Marked degree of gelation | — | — | — | — |
| Example 30 | TMC 10.25 [0.0488] | PMC 14.20 [0.0489] | DPDI 22.18 [0.1055] | TPA-Na 0.7368 [0.0039] | 250 [187] | 1.08 | 15.4 | 132 | 1.43 | 1,480 9 | 327 | 509 | >3 × 10$^4$ |
| Example 31 | TMC 10.31 [0.0491] | PMC 14.25 [0.0491] | DPDI 21.11 [0.1004] | TPA-Na 0.3702 [0.0020] | 250 [183] | 1.02 | 15.8 | 126 | 1.37 | 1,490 10 | 325 | 511 | >3 × 10$^4$ |
| Example 32 | TMC 10.14 [0.0483] | PMC 14.07 [0.0485] | DPDI 19.92 [0.0948] | TPA-Na 0.3640 [0.0019] | 250 [177] | 0.98 | 15.6 | 90 | 1.12 | 1,130 6.5 | 323 | 504 | >3 × 10$^3$ |
| Comparative Example 28 | TMC 10.19 [0.0485] | PMC 14.13 [0.0487] | DPDI 22.06 [0.1049] | — | 250 [186] | 1.08 | — | — | Gelation | — | — | — | — |
| Comparative Example 29 | TMC 10.43 [0.0496] | PMC 14.37 [0.0496] | DPDI 21.27 [0.1012] | — | 250 [184] | 1.02 | — | — | Marked degree of gelation | — | — | — | — |
| Comparative Example 30 | TMC 10.22 [0.0486] | PMC 14.08 [0.0485] | DPDI 20.05 [0.0954] | — | 250 [177] | 0.98 | 15.4 | 1.2 | 0.32 | 680 2 | 316 | 459 | 285 |

What is claimed is:

1. In a process for the preparation of a polyamide compound having one or more repeating units selected from the group consisting essentially of repeating units of the general formulas $$+OC-R_1-CONH-R_4-NH+,$$

$$\left[\begin{array}{c} OC-R_2 \begin{array}{c} COOH \\ \\ CONH-R_4-NH \end{array} \end{array}\right] \text{ and}$$

$$\left[\begin{array}{c} HOOC \quad COOH \\ R_3 \\ OC \quad CONH-R_4-NH \end{array}\right]$$

by reacting at least one polycarboxylic acid selected from the group consisting of dicarboxylic acids of the general formula $$HOOC-R_1-COOH,$$

tricarboxylic acids of the general formula $$HOOC-R_2\begin{array}{c} COOH \\ \\ COOH \end{array}$$

and tetracarboxylic acids of the general formula $$\begin{array}{c} HOOC \quad COOH \\ R_3 \\ HOOC \quad COOH \end{array}$$

with at least one diisocyanate of the general formula $$OCN-R_4-NCO$$

where $R_1$ is a divalent radical containing at least two carbon atoms or such a radical additionally having one or more substituents comprising radicals or atoms that are unreactive or scarcely reactive with carboxyl or isocyanate groups, the two carbonyl groups adjacent to the $R_1$ radical being attached to two different carbon atoms contained in the $R_1$ radical, $R_2$ is a trivalent radical containing at least three carbon atoms or such a radical additionally having one or more substituents comprising radicals or atoms that are unreactive or scarcely reactive with carboxyl or isocyanate groups, two of the three carbonyl groups adjacent to the $R_2$ radical being attached to two adjacent carbon atoms contained in the $R_2$ radical and the remaining one being attached to another carbon atom contained in the $R_2$ radical, $R_3$ is a tetravalent radical containing at least four carbon atoms or such a radical additionally having one or more substituents comprising radicals or atoms that are unreactive or scarcely reactive with carboxyl or isocyanate groups, the four carbonyl groups adjacent to the $R_3$ radical being attached to four different carbon atoms contained in the $R_3$ radical and constituting two different pairs of adjacent carbon atoms, and $R_4$ is a divalent radical containing at least two carbon atoms or such a radical additionally having one or more substituents comprising radicals or atoms that are unreactive or scarcely reactive with carboxyl or isocyanate groups, the two nitrogen atoms adjacent to the $R_4$ radical being attached to two different carbon atoms contained in the $R_4$ radical, the improvement which comprises effecting the reaction in the presence of at least one mono-alkali metal salt of dicarboxylic acid of the general formula $$HOOC-R_5-COOM$$

where $R_5$ is a divalent radical defined similarly to $R_1$ but may be the same as or different from $R_1$, and M is an alkali metal belonging to the group $I_A$ in the periodic table.

2. A process as claimed in claim 1 wherein the reaction is effected in an anhydrous organic polar solvent.

3. A process as claimed in claim 1 wherein the reaction is effected under an atmosphere of an inert gas at a temperature of 50° to 200° C. with removal of the carbon dioxide gas evolved.

4. A process as claimed in claim 2 wherein the reaction is effected under an atmosphere of an inert gas at a temperature of 50° to 200° C. with removal of the carbon dioxide gas evolved.

5. A process as claimed in any of claims 1-4 wherein the concentration of the starting monomers including the polycarboxylic acid and the diisocyanate is in the range of 50 to 40 g/l of solvent.

6. A process as claimed in any of claims 1-4 wherein the molar ratio of the diisocyanate to the polycarboxylic acid is in the range of 0.7 to 1.30.

7. A process as claimed in any of claims 1-4 wherein the mono-alkali metal salt of dicarboxylic acid is used in an amount of 0.5 to 20 mole % based on the amount of the polycarboxylic acids.

8. A process as claimed in claim 7 wherein the mono-alkali metal salt of dicarboxylic acid is used in an amount of 1 to 10 mole %.

9. A process as claimed in claim 1 wherein the mono-alkali metal salt of dicarboxylic acid is selected from the group consisting of the monolithium, monosodium and monopotassium salts of adipic acid, sebacic acid, isophthalic acid, terephthalic acid, pyridine-2,6-dicarboxylic acid, tetrahydrofuran-2,5-dicarboxylic acid and cyclohexane-1,4-dicarboxylic acid.

10. A process as claimed in claim 1 wherein the dicarboxylic acids include adipic acid, terephthalic acid, isophthalic acid, diphenyl ether-4,4'-dicarboxylic acid, pyridine-2,6-dicarboxylic acid, diphenylmethane-4,4'-bis(trimellitic imide acid) and diphenyl ether-4,4'-bis(trimellitic imide acid).

11. A process as claimed in claim 1 where the tricarboxylic acids include pentane-1,2,5-tricarboxylic acid, cyclohexane-1,2,3-tricarboxylic acid, benzene-1,2,4-tricarboxylic acid, naphthalene-1,4,5-tricarboxylic acid, naphthalene-2,3,6-tricarboxylic acid, diphenyl-3,4,4'-tricarboxylic acid, diphenyl ether-3,4,4'-tricarboxylic acid and benzophenone-3,3',4-tricarboxylic acid.

12. A process as claimed in claim 1 wherein the tetracarboxylic acids include butane-1,2,3,4-tetracarboxylic acid, benzene-1,2,4,5-tetracarboxylic acid, naphthalene-1,4,5,8-tetracarboxylic acid, naphthalene-2,3,6,7-tetracarboxylic acid, biphenyl-3,3',4,4'-tetracarboxylic acid, benzophenone-3,3',4,4'-tetracarboxylic acid, diphenyl ether-3,3',4,4'-tetracarboxylic acid and diphenyl sulfone-3,3'-4,4'-tetracarboxylic acid.

13. A process as claimed in claim 1 wherein the diisocyanate are selected from the group consisting of hexamethylene-1,6-diisocyanate, dicyclohexylmethane-4,4'-diisocyanate, phenylene-1,3-diisocyanate, phenylene-1,4-diisocyanate, toluylene-2,4-diisocyanate, toluylene-2,6-diisocyanate, diphenylmethane-4,4'-diisocyanate and diphenyl ether-4,4'-diisocyanate.

* * * * *